US012798281B2

(12) United States Patent
Pan

(10) Patent No.: US 12,798,281 B2
(45) Date of Patent: Nov. 17, 2026

(54) ADJUSTABLE FILE FOLDER

(71) Applicant: Shenzhen Chuhaibiaogan Technology Co., Ltd, Shenzhen (CN)

(72) Inventor: Jingwei Pan, Shenzhen (CN)

(73) Assignee: Shenzhen Chuhaibiaogan Technology Co., Ltd, Shenzhen (CN)

( * ) Notice: Subject to any disclaimer, the term of this patent is extended or adjusted under 35 U.S.C. 154(b) by 116 days.

(21) Appl. No.: 18/929,306

(22) Filed: Oct. 28, 2024

(65) Prior Publication Data

US 2026/0116117 A1 Apr. 30, 2026

(51) Int. Cl.
*B42F 7/14* (2006.01)
*B42F 7/04* (2006.01)
*B42F 21/02* (2006.01)

(52) U.S. Cl.
CPC .................. *B42F 7/14* (2013.01); *B42F 7/04* (2013.01); *B42F 21/02* (2013.01)

(58) Field of Classification Search
CPC .... B42F 21/02; B42F 7/04; B42F 7/14; B42F 7/06; B42F 7/08; B42P 2241/04
USPC ................. 220/500, 639–654, 666; 206/425; 229/199, 67.1–67.4
See application file for complete search history.

(56) References Cited

U.S. PATENT DOCUMENTS 909,734 A * 1/1909 Zoerb .................... B65D 27/08 229/72
1,634,450 A * 7/1927 Bushnell ................... B42F 7/08 229/67.3
1,745,249 A * 1/1930 Doughty ................... B42F 7/08 383/33
3,391,698 A * 7/1968 Wiles ........................ B42F 7/06 229/72
4,262,838 A * 4/1981 Mackenzie ............... B42F 7/14 402/79
4,274,577 A * 6/1981 Walsh, Jr. ................. B42F 7/08 229/928
5,064,069 A * 11/1991 Su ............................ B42F 7/08 190/900
5,119,950 A * 6/1992 Takemura ................. B42F 7/06 206/215
5,271,502 A * 12/1993 Chang ....................... B42F 7/08 229/72
5,593,086 A * 1/1997 Ho ............................ B42F 7/08 229/67.3
5,630,509 A * 5/1997 Su ............................ B42F 7/08 229/67.3

(Continued)

*Primary Examiner* — Chun Hoi Cheung

(57) ABSTRACT

A folder includes a first enclosure member, a second enclosure member, a stretchable and retractable connecting member, and a support member. The first enclosure member and the second enclosure member are arranged opposite to each other and form an accommodating space, and the accommodating space is used for receiving files. The stretchable and retractable connecting member is connected between the first enclosure member and the second enclosure member, and a size of the accommodating space changes with stretching and retracting of the stretchable and retractable connecting member. The support member is detachably connected between the first enclosure member and the second enclosure member, and the support member is used for limiting the accommodating space to a predetermined size.

17 Claims, 6 Drawing Sheets

(56) References Cited

U.S. PATENT DOCUMENTS

| | | | | | |
|---|---|---|---|---|---|
| 5,664,724 | A * | 9/1997 | Ho | B42F 7/08 229/67.4 |
| 6,330,968 | B1 * | 12/2001 | Peleman | B42F 7/14 229/67.4 |
| 6,431,357 | B1 * | 8/2002 | Su | B42F 7/08 229/67.3 |
| 6,669,080 | B2 * | 12/2003 | Ong | B42F 7/08 150/113 |
| 6,880,747 | B1 * | 4/2005 | Pelleg | B42F 7/08 229/67.3 |
| 7,789,290 | B2 * | 9/2010 | Hsieh | B42F 7/08 229/67.4 |
| 8,038,052 | B2 * | 10/2011 | Huang | B42F 7/08 229/67.3 |
| 8,596,516 | B2 * | 12/2013 | Dodson | B65D 37/00 229/928 |
| 8,978,912 | B1 * | 3/2015 | Kraeling | B65D 7/26 220/531 |
| 2003/0029762 | A1 * | 2/2003 | Ho | B42F 7/08 229/928 |
| 2005/0205449 | A1 * | 9/2005 | Frankeny | B42F 7/08 206/214 |
| 2007/0194090 | A1 * | 8/2007 | Chou | B42F 7/08 229/72 |
| 2007/0227926 | A1 * | 10/2007 | Shapiro | B42F 7/08 206/425 |
| 2007/0235506 | A1 * | 10/2007 | Shapiro | B42F 7/08 229/67.3 |
| 2010/0116873 | A1 * | 5/2010 | Dodson | B65D 37/00 229/67.3 |

* cited by examiner

ADJUSTABLE FILE FOLDER

TECHNICAL FIELD

The present invention relates to the field of folders, particularly to a folder.

BACKGROUND ART

With the continuous increase of information in modern society, the demand for file organization and storage by individuals and enterprises is growing day by day. When a total number of files increases, a regular folder is easy to deform or lose its original shape, resulting in files being not neat and difficult to be found. In addition, a fixed size of regular folders limits their applicability and cannot flexibly adapt to the storage needs of different numbers of files.

Therefore, there is an urgent need on the market to provide a folder that can ensure the flexibility of the folder and maintain the stability of the folder by arranging a detachable support structure while ensuring a function of stretching and retracting.

SUMMARY

In order to overcome the shortcomings of the prior art, a folder is provided in the present invention. By arranging a support structure, not only the flexibility of the folder is ensured, but the stability of the folder is maintained at the same time.

The technical solution adopted by the present invention to solve its technical problem is as follows.

A folder is provided in the present invention, including:

a first enclosure member;

a second enclosure member, wherein the first enclosure member and the second enclosure member are arranged opposite to each other and form an accommodating space, and the accommodating space is used for receiving files;

a stretchable and retractable connecting member, wherein the stretchable and retractable connecting member is connected between the first enclosure member and the second enclosure member, and a size of the accommodating space changes with stretching and retracting of the stretchable and retractable connecting member; and a support member, wherein the support member is detachably connected between the first enclosure member and the second enclosure member, and the support member is used for limiting the accommodating space to a predetermined size.

As an improvement of the present invention, the stretchable and retractable connecting member includes a first stretchable and retractable wall and a second stretchable and retractable wall. The first enclosure member is provided with a first left side end and a first right side end designed opposite to the first left side end. The second enclosure member is provided with a second left side end and a second right side end opposite to the second left side end. The first stretchable and retractable wall is connected between the first left side end and the second left side end, and the second stretchable and retractable wall is connected between the first right side end and the second right side end.

As an improvement of the present invention, the stretchable and retractable connecting member further includes a third stretchable and retractable wall. The first enclosure member is provided with a first bottom end, and the second enclosure member is provided with a second bottom end.

The third stretchable and retractable wall is connected between the first bottom end and the second bottom end, and stretched and retracted states of the third stretchable and retractable wall change with stretched and retracted states of the first stretchable and retractable wall and the second stretchable and retractable wall.

As an improvement of the present invention, the first stretchable and retractable wall includes a first accordion-like folded sheet, the second stretchable and retractable wall includes a second accordion-like folded sheet, and the third stretchable and retractable wall includes a third accordion-like folded sheet.

As an improvement of the present invention, the support member is detachably connected to the first enclosure member and the second enclosure member through a connecting device. The connecting device includes a connecting member provided on the support member. The connecting device further includes a connecting fitting member provided on the first enclosure member and the second enclosure member.

As an improvement of the present invention, the connecting member is a hook surface of a hook and loop fastener, and the connecting fitting member is a loop surface of the hook and loop fastener.

As an improvement of the present invention, the support member includes a first support plate. The first support plate is equipped with a first left side edge and an opposite first right side edge. First connecting side plates are respectively rotatably connected to the first left side edge and the first right side edge. The first support plate is connected between the first left side end and the second left side end through the first connecting side plates.

As an improvement of the present invention, the support member includes a second support plate. The second support plate is equipped with a second left side edge and an opposite second right side edge. Second connecting side plates are respectively rotatably connected to the second left side edge and the second right side edge. The second support plate is connected between the first right side end and the second right side end through the second connecting side plates.

As an improvement of the present invention, the first connecting side plates include connecting surfaces that are connected to the first enclosure member and the second enclosure member. The connecting surface is provided with a connecting member. One surface of the first enclosure member connected to the first connecting side plate is provided with a connecting fitting member, and one surface of the second enclosure member connected to the first connecting side plate is provided with a connecting fitting member. The connecting member is a hook surface of a hook and loop fastener, and the connecting fitting member is a loop surface of the hook and loop fastener.

As an improvement of the present invention, the second connecting side plates include connecting surfaces that are connected to the first enclosure member and the second enclosure member. The connecting surface is provided with a connecting member. One surface of the first enclosure member connected to the second connecting side plate is provided with a connecting fitting member, and one surface of the second enclosure member connected to the second connecting side plate is provided with a connecting fitting member. The connecting member is a hook surface of a hook and loop fastener, and the connecting fitting member is a loop surface of the hook and loop fastener.

As an improvement of the present invention, a gap is defined between an end portion of the first stretchable and retractable wall near the third stretchable and retractable wall and the third stretchable and retractable wall. A gap is defined between an end portion of the second stretchable and retractable wall near the third stretchable and retractable wall and the third stretchable and retractable wall.

As an improvement of the present invention, the first accordion-like folded sheet is provided with first folded end surfaces connected to the first enclosure member and the second enclosure member, respectively. The first folded end surfaces are connected to an inner surface of the first enclosure member and an inner surface of the second enclosure member through hot pressing. The second accordion-like folded sheet is provided with second folded end surfaces connected to the first enclosure member and the second enclosure member, respectively. The second folded end surfaces are connected to the inner surface of the first enclosure member and the inner surface of the second enclosure member through hot pressing. The third accordion-like folded sheet is provided with third folded end surfaces connected to the first enclosure member and the second enclosure member, respectively. The third folded end surfaces are connected to the inner surface of the first enclosure member and the inner surface of the second enclosure member through hot pressing.

As an improvement of the present invention, a plurality of partition components are provided inside the accommodating space. The partition component is connected between the first stretchable and retractable wall and the second stretchable and retractable wall through hot pressing. The partition component divides the accommodating space into a plurality of accommodating units. One end of the partition component is connected to the third stretchable and retractable wall through hot pressing.

As an improvement of the present invention, a protruding identification component is provided at one end of the partition component away from the third stretchable and retractable wall. The partition component includes a first partition member and a second partition member. The first partition member is equipped with a first identification member, and the second partition member is equipped with a second identification member. The first identification member and the second identification member are designed in a staggered manner.

As an improvement of the present invention, the partition component further includes a third partition member, a fourth partition member, a fifth partition member, and a sixth partition member. The third partition member is provided with a third identification member, the fourth partition member is provided with a fourth identification member, the fifth partition member is provided with a fifth identification member, and the sixth partition member is provided with a sixth identification member. The first identification member, the second identification member, the third identification member, the fourth identification member, the fifth identification member, and the sixth identification member are designed in a staggered manner.

As an improvement of the present invention, an accommodating opening for receiving files is defined in the accommodating space. A cover is connected to one side of the second enclosure member near the accommodating opening. The cover is capable of being flipped over to close the accommodating opening.

As an improvement of the present invention, one end of the cover away from the second enclosure member is provided with a locking member, an outer surface of the first enclosure member is provided with a first locking fitting member, and the stretchable and retractable connecting member has a retracted state and a stretched state. When the stretchable and retractable connecting member is in the stretched state, the cover is capable of fully covering the accommodating opening, and the locking member is configured for engaging with the first locking fitting member to achieve locking.

As an improvement of the present invention, the second enclosure member is equipped with a second locking fitting member. When the stretchable and retractable connecting member is in the retracted state, the cover is capable of fully covering the accommodating opening, and the locking member is configured for engaging with the second locking fitting member to achieve locking.

As an improvement of the present invention, the locking member is an elastic tightening strap. The first locking fitting member is a first buckle. When the stretchable and retractable connecting member is in the stretched state, the elastic tightening strap can be sleeved on the first buckle to achieve a purpose of locking. The second enclosure member is equipped with a hollow clamping slot. A protruding second buckle is provided inside the hollow clamping slot. When the stretchable and retractable connecting member is in the retracted state, the elastic tightening strap is capable of wrapping around a bottom portion of the first enclosure member and a bottom portion of the second enclosure member and being sleeved on the second buckle to achieve the purpose of locking.

As an improvement of the present invention, an accommodating opening for receiving files is defined in the accommodating space. The first enclosure member and/or the second enclosure member are/is provided with a notch on one side near the accommodating opening. The notch is used for hanging a pen cap.

Beneficial effects of the present invention are as follows. The folder is provided in the present invention, including the first enclosure member, the second enclosure member, the stretchable and retractable connecting member, and the support member. The first enclosure member and the second enclosure member are arranged opposite to each other and form the accommodating space, and the accommodating space is used for receiving files. The stretchable and retractable connecting member is connected between the first enclosure member and the second enclosure member, and the size of the accommodating space changes with stretching and retracting of the stretchable and retractable connecting member. The support member is detachably connected between the first enclosure member and the second enclosure member, and the support member is used for limiting the accommodating space to the predetermined size. Through the above structure, the first enclosure member and the second enclosure member are designed relative to each other to form the accommodating space, so that a user can place files in the accommodating space. The stretchable and retractable connecting member are connected between the first enclosure member and the second enclosure member, and the accommodating space becomes larger with the stretching of the stretchable and retractable connecting member, and becomes smaller with the retracting of the stretchable and retractable connecting member, making it easier for the user to adjust a capacity of the folder according to an actual situation. Moreover, since the support member is detachably connected between the first enclosure member and the second enclosure member, when the support member is connected between the first enclosure member and the second enclosure member, the stretchable and retractable connecting member is stretched to a length that matches a width of the support member. Under a support force of the support member, the accommodating space is limited to the predetermined size, effectively keeping the folder in a stable state for placing or taking files. When the support member is removed, the stretchable and retractable connecting member is in a stretchable or compressible state, making it easy for the user to place files of any size, or to store and transport the folder.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
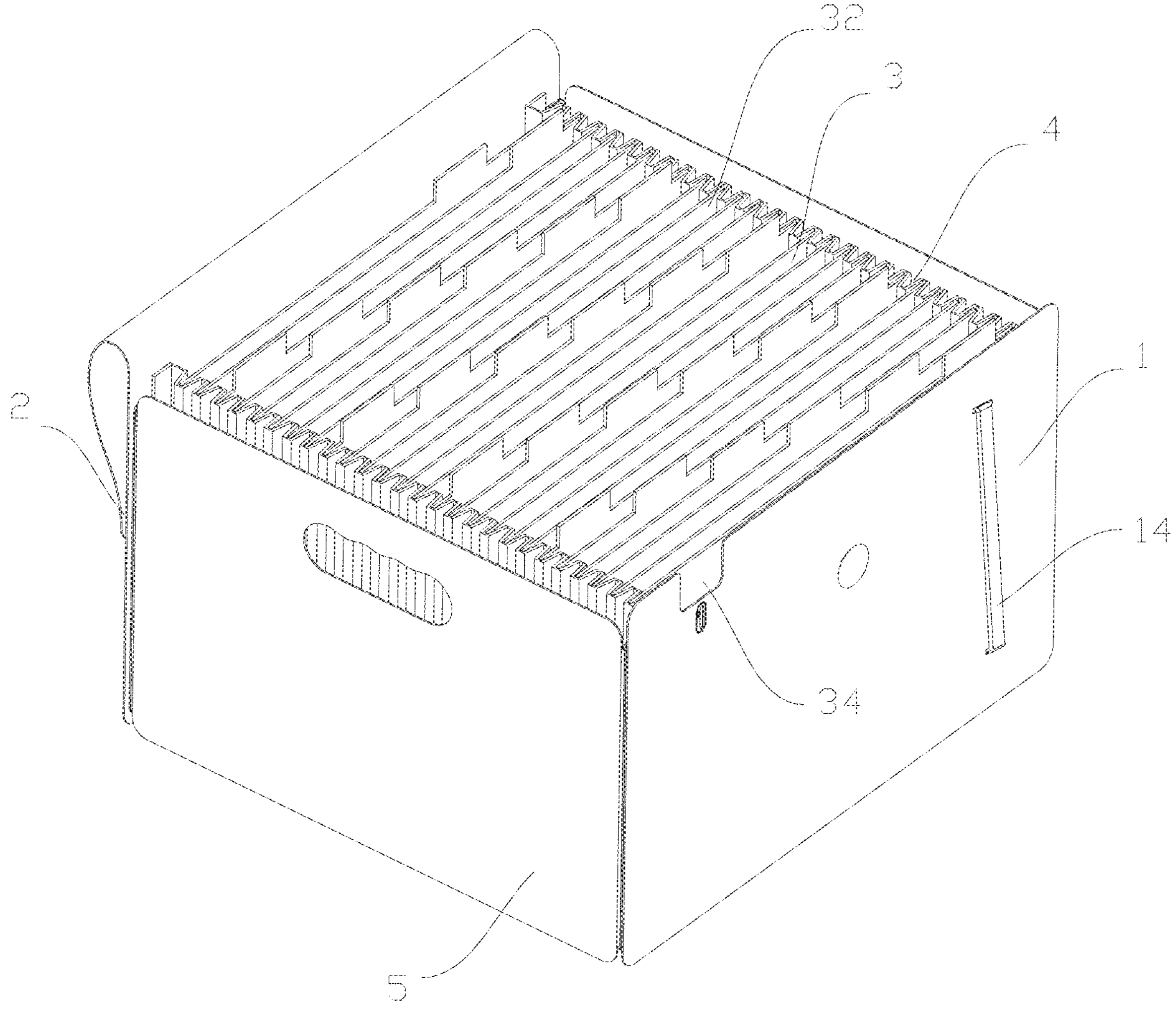
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
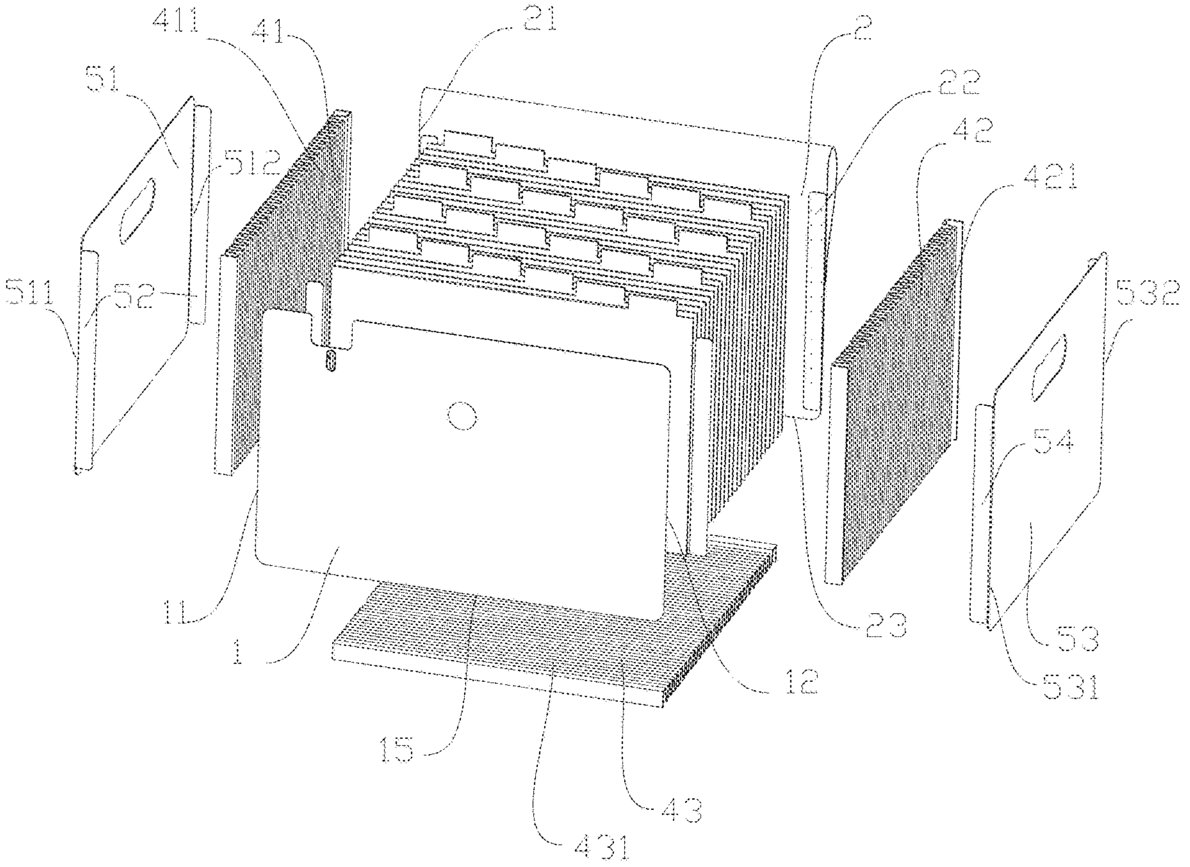
FIG. 2 is an exploded view of the present invention.
Figure 3:
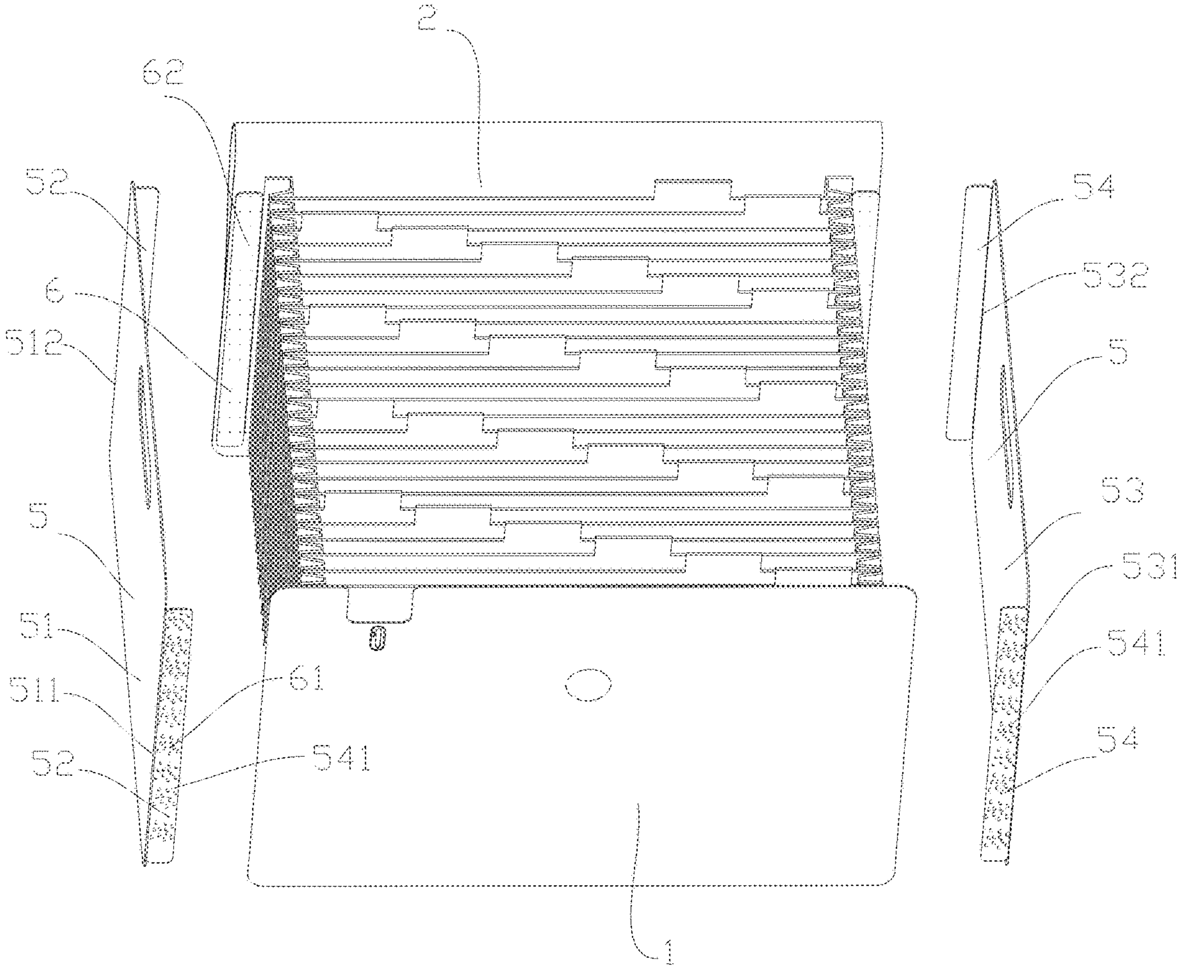
FIG. 3 is another exploded view of the present invention.
Figure 4:
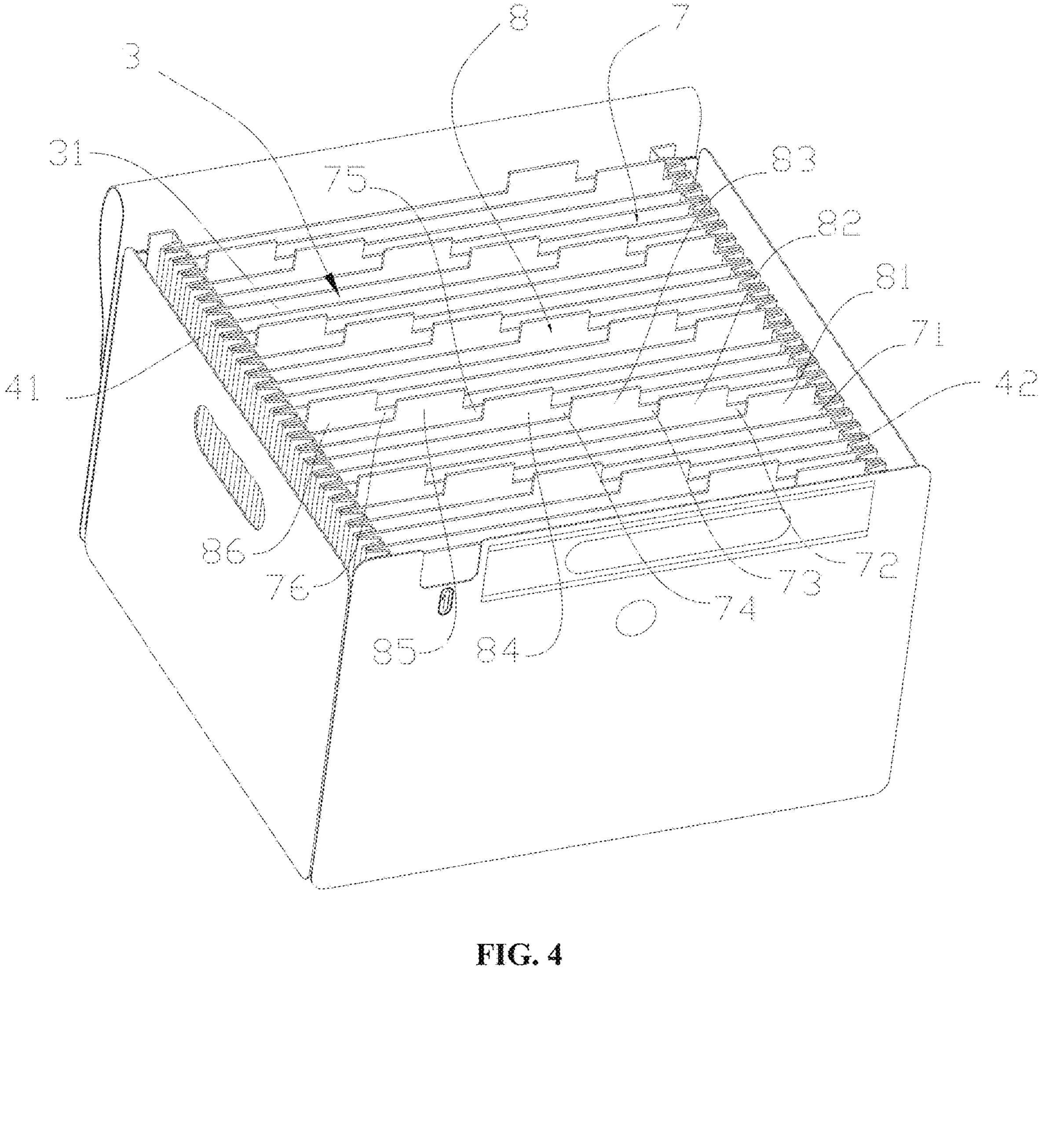
FIG. 4 is a schematic diagram of a structure of the present invention from another angle of view.
Figure 5:
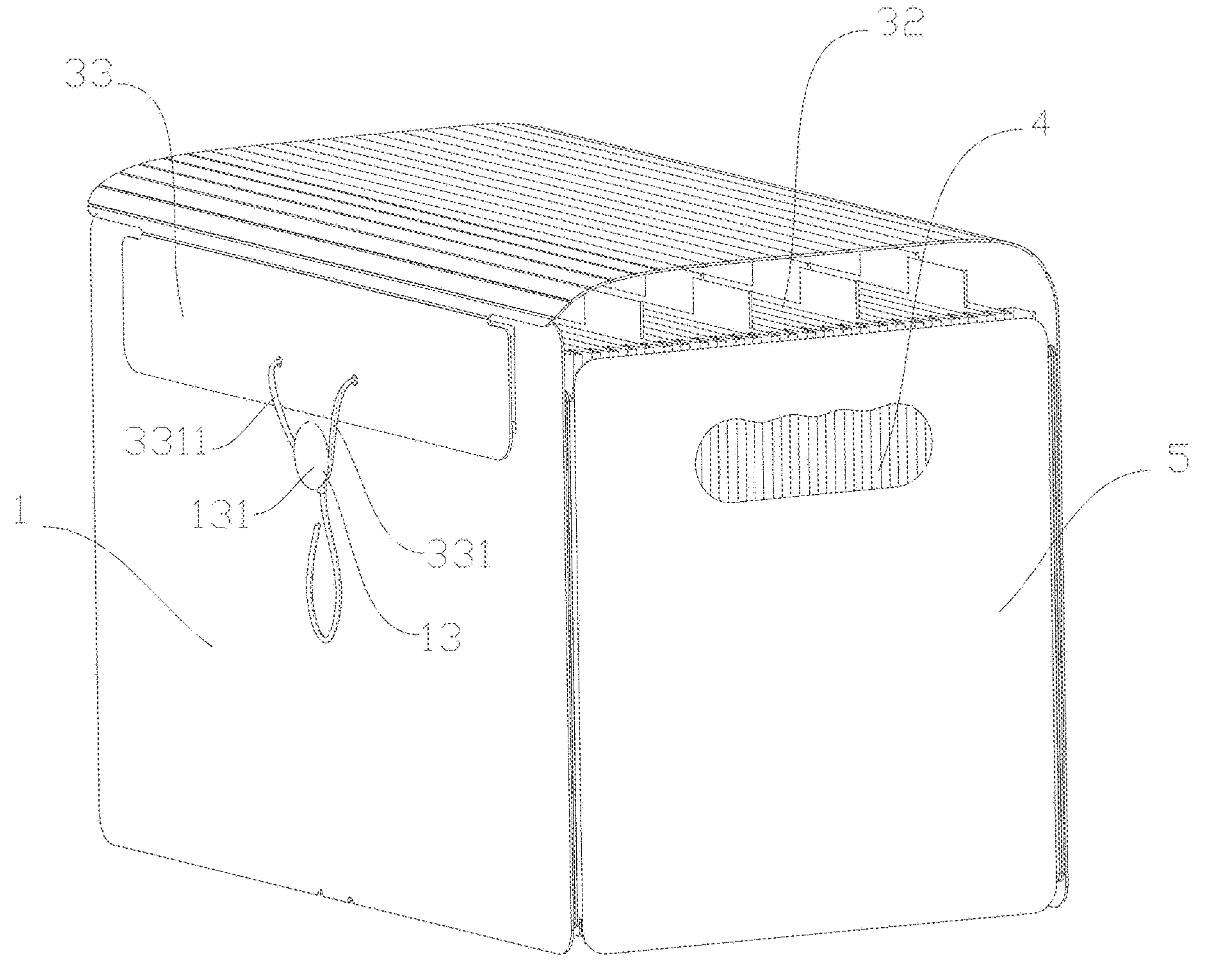
FIG. 5 is a schematic diagram of a structure of the present invention when a cover is closed.
Figure 6:
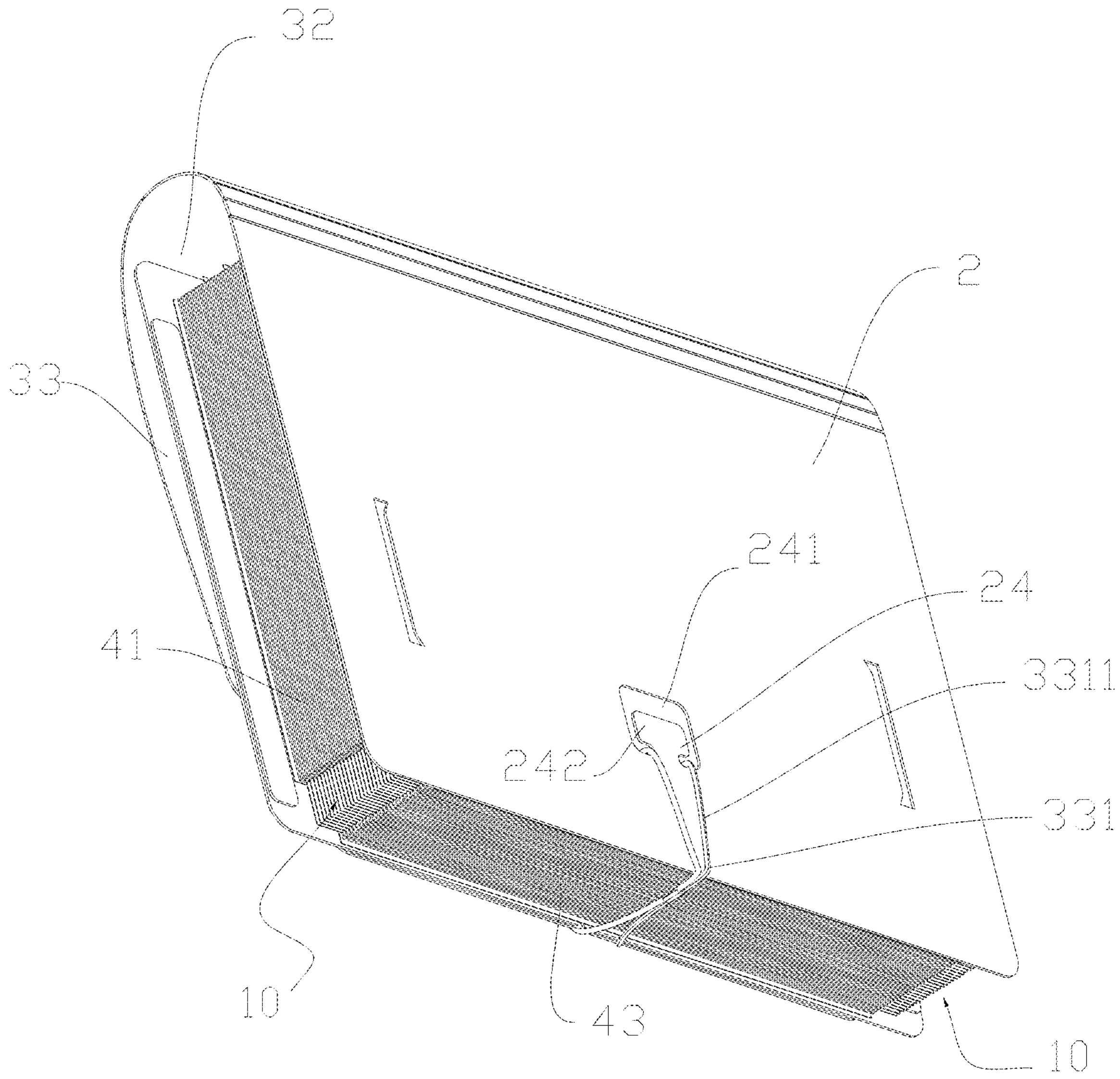
FIG. 6 is another schematic diagram of a structure of the present invention when a cover is closed.

Referring to FIGS. 1-5, a folder includes a first enclosure member 1, a second enclosure member 2, a stretchable and retractable connecting member 4, and a support member 5. The first enclosure member 1 and the second enclosure member 2 are arranged opposite to each other and form an accommodating space 3, and the accommodating space 3 is used for receiving files. The stretchable and retractable connecting member 4 is connected between the first enclosure member 1 and the second enclosure member 2, and a size of the accommodating space 3 changes with stretching and retracting of the stretchable and retractable connecting member 4. The support member 5 is detachably connected between the first enclosure member 1 and the second enclosure member 2, and the support member 5 is used for limiting the accommodating space 3 to a predetermined size.

Through the above structure, the first enclosure member 1 and the second enclosure member 2 are designed opposite to each other to form the accommodating space 3, so that a user can place files in the accommodating space 3. The stretchable and retractable connecting member 4 is connected between the first enclosure member 1 and the second enclosure member 2. The accommodating space 3 becomes larger with the stretching of the stretchable and retractable connecting member 4, and becomes smaller with the retracting of the stretchable and retractable connecting member 4, making it easier for the user to adjust a capacity of the folder according to an actual situation. Moreover, since the support member 5 is detachably connected between the first enclosure member 1 and the second enclosure member 2, when the support member 5 is connected between the first enclosure member 1 and the second enclosure member 2, the stretchable and retractable connecting member 4 is stretched to a length that matches a width of the support member 5. Under a support force of the support member 5, the accommodating space 3 is limited to the predetermined size, effectively keeping the folder in a stable state for placing or taking files. When the support member 5 is removed, the stretchable and retractable connecting member 4 is in a stretchable or compressible state, making it easy for the user to place files of any size, or to store and transport the folder.

In this embodiment, both the first enclosure member 1 and the second enclosure member 2 are solid hard plates. Specifically, the first enclosure member 1 and the second enclosure member 2 are made of wheat straw material or PP material.

In this embodiment, the stretchable and retractable connecting member 4 includes a first stretchable and retractable wall 41 and a second stretchable and retractable wall 42. The first enclosure member 1 is provided with a first left side end 11 and a first right side end 12 designed opposite to the first left side end 11. The second enclosure member 2 is provided with a second left side end 21 and a second right side end 22 opposite to the second left side end 21. The first stretchable and retractable wall 41 is connected between the first left side end 11 and the second left side end 21, and the second stretchable and retractable wall 42 is connected between the first right side end 12 and the second right side end 22. Through the above structure, by providing stretchable and retractable walls on both sides of the first enclosure member 1 and the second enclosure member 2, the accommodating space 3 with adjustable size is surrounded and formed between the first enclosure member 1, the second enclosure member 2, the first stretchable and retractable wall 41, and the second stretchable and retractable wall 42. Moreover, the stretchable and retractable walls on both sides play a role in preventing files from falling out of the accommodating space 3, forming the stable folder with adjustable size for storing files.

In this embodiment, the stretchable and retractable connecting member 4 further includes a third stretchable and retractable wall 43. The first enclosure member 1 is provided with a first bottom end 15, and the second enclosure member 2 is provided with a second bottom end 23. The third stretchable and retractable wall 43 is connected between the first bottom end 15 and the second bottom end 23, and stretched and retracted states of the third stretchable and retractable wall 43 change with stretched and retracted states of the first stretchable and retractable wall 41 and the second stretchable and retractable wall 42. Specifically, the first stretchable and retractable wall 41 includes a first accordion-like folded sheet 411, the second stretchable and retractable wall 42 includes a second accordion-like folded sheet 421, and the third stretchable and retractable wall 43 includes a third accordion-like folded sheet 431. Through the above structure, the first stretchable and retractable wall 41, the second stretchable and retractable wall 42, and the third stretchable and retractable wall 43 together form a multidimensional stretchable and retractable structure. The third stretchable and retractable wall 43 is connected between a bottom end of the first enclosure member 1 and a bottom end of the second enclosure member 2, and the stretched and retracted states of the third stretchable and retractable wall 43 changes synchronously with the states of the first stretchable and retractable wall 41 and the second stretchable and retractable wall 42. This design ensures that when the folder is stretching or retracting, three surfaces are synchronized to stretch or retract, increasing a storage area and enhancing the overall flexibility and coordination. Moreover, the characteristic of accordion-like folded sheets is that the folder can be tightly folded when not in use to minimize a space occupied by the folder, and the folder can be quickly unfolded when needs to be stretched to provide sufficient storage space, thereby meeting storage needs of the user for different capacities of files.

In this embodiment, the support member 5 is detachably connected to the first enclosure member 1 and the second enclosure member 2 through a connecting device 6. The connecting device 6 includes a connecting member 61 provided on the support member 5. The connecting device 6 further includes a connecting fitting member 62 provided on the first enclosure member 1 and the second enclosure member 2. Specifically, in this embodiment, the connecting member 61 is a hook surface of a hook and loop fastener, and the connecting fitting member 62 is a loop surface of the hook and loop fastener. Through the above structure, in this embodiment, the support member 5 is detachably connected to the first enclosure member 1 and the second enclosure member 2 through the hook and loop fastener, which is convenient, fast, and reusable, greatly increasing the convenience and durability of the folder.

In this embodiment, the support member 5 includes a first support plate 51. The first support plate 51 is equipped with a first left side edge 511 and an opposite first right side edge 512. First connecting side plates 52 are respectively rotatably connected to the first left side edge 511 and the first right side edge 512. The first support plate 51 is connected between the first left side end 11 and the second left side end 21 through the first connecting side plates 52. Specifically, the first support plate 51 is arranged at a nearly perpendicular angle to the first enclosure member 1 and the second enclosure member 2, while the first connecting side plates 52 are relatively rotated to a state parallel to the first enclosure member 1 and the second enclosure member 2. At this time, connecting planes of the first connecting side plates 52 are connected to an inner surface of the first enclosure member 1 and an inner surface of the second enclosure member 2.

Furthermore, the support member 5 includes a second support plate 53. The second support plate 53 is equipped with a second left side edge 531 and an opposite second right side edge 532. Second connecting side plates 54 are respectively rotatably connected to the second left side edge 531 and the second right side edge 532. The second support plate 53 is connected between the first right side end 12 and the second right side end 22 through the second connecting side plates 54. Similarly, the second support plate 53 is arranged at a nearly perpendicular angle to the first enclosure member 1 and the second enclosure member 2, while the second connecting side plates 54 are relatively rotated to a state parallel to the first enclosure member 1 and the second enclosure member 2. At this time, connecting planes of the second connecting side plates 54 are connected to an inner surface of the first enclosure member 1 and an inner surface of the second enclosure member 2.

In this embodiment, the first connecting side plates 52 include connecting surfaces 541 that are connected to the first enclosure member 1 and the second enclosure member 2. The connecting surface 541 is provided with a connecting member 61. One surface of the first enclosure member 1 connected to the first connecting side plate 52 is provided with a connecting fitting member 62, and one surface of the second enclosure member 2 connected to the first connecting side plate 52 is provided with a connecting fitting member 62. The connecting member 61 is a hook surface of a hook and loop fastener, and the connecting fitting member 62 is a loop surface of the hook and loop fastener. Through the above structure, further, the second connecting side plates 54 include connecting surfaces 541 that are connected to the first enclosure member 1 and the second enclosure member 2. The connecting surface 541 is provided with a connecting member 61. One surface of the first enclosure member 1 connected to the second connecting side plate 54 is provided with a connecting fitting member 62, and one surface of the second enclosure member 2 connected to the second connecting side plate 54 is provided with a connecting fitting member 62. The connecting member 61 is a hook surface of a hook and loop fastener, and the connecting fitting member 62 is a loop surface of the hook and loop fastener. Through the above structure, by using the hook and loop fastener, it is convenient for the user to quickly install the first support plate 51 and the second support plate 53 on both side ends of the folder, while also facilitating disassembly and replacement.

In this embodiment, both the first support plate 51 and the second support plate 53 are equipped with handgrip slots to facilitate the user in lifting the entire folder through the handgrip slots. In other embodiments, the first enclosure member 1 and/or the second enclosure member 2 may also be provided with handgrip slots.

In this embodiment, a gap 10 is defined between an end portion of the first stretchable and retractable wall 41 near the third stretchable and retractable wall 43 and the third stretchable and retractable wall 43. A gap 10 is defined between an end portion of the second stretchable and retractable wall 42 near the third stretchable and retractable wall 43 and the third stretchable and retractable wall 43. Through the above structure, the gaps 10 avoid friction between the stretchable and retractable walls when the stretchable and retractable walls performs actions of stretching and retracting, making actions of opening and compressing of the folder smoother.

In this embodiment, the first accordion-like folded sheet 411 is provided with first folded end surfaces connected to the first enclosure member 1 and the second enclosure member 2, respectively. The first folded end surfaces are connected to an inner surface of the first enclosure member 1 and an inner surface of the second enclosure member 2 through hot pressing. The second accordion-like folded sheet 421 is provided with second folded end surfaces connected to the first enclosure member 1 and the second enclosure member 2, respectively. The second folded end surfaces are connected to the inner surface of the first enclosure member 1 and the inner surface of the second enclosure member 2 through hot pressing. The third accordion-like folded sheet 431 is provided with third folded end surfaces connected to the first enclosure member 1 and the second enclosure member 2, respectively. The third folded end surfaces are connected to the inner surface of the first enclosure member 1 and the inner surface of the second enclosure member 2 through hot pressing. Through the above structure, hot pressing molding ensures the stability of the folder and avoids the phenomenon of damage when a large number of files are placed in the folder.

In this embodiment, a plurality of partition components 7 are provided inside the accommodating space 3. The partition component 7 is connected between the first stretchable and retractable wall 41 and the second stretchable and retractable wall 42 through hot pressing. The partition component 7 divides the accommodating space 3 into a plurality of accommodating units 31. One end of the partition component 7 is connected to the third stretchable and retractable wall 43 through hot pressing. Through the above structure, the plurality of accommodating units 31 facilitate the user to categorize a large number of files, improving the flexibility and practicality of storage of the folder.

Furthermore, a protruding identification component 8 is provided at one end of the partition component 7 away from the third stretchable and retractable wall 43. The partition component 7 includes a first partition member 71 and a second partition member 72. The first partition member 71 is equipped with a first identification member 81, and the second partition member 72 is equipped with a second identification member 82. The first identification member 81 and the second identification member 82 are designed in a staggered manner.

Furthermore, the partition component 7 further includes a third partition member 73, a fourth partition member 74, a fifth partition member 75, and a sixth partition member 76. The third partition member 73 is provided with a third identification member 83, the fourth partition member 74 is provided with a fourth identification member 84, the fifth partition member 75 is provided with a fifth identification member 85, and the sixth partition member 76 is provided with a sixth identification member 86. The first identification member 81, the second identification member 82, the third identification member 83, the fourth identification member 84, the fifth identification member 85, and the sixth identification member 86 are designed in a staggered manner. Specifically, the first identification member 81, the second identification member 82, the third identification member 83, the fourth identification member 84, the fifth identification member 85, and the sixth identification member 86 are designed in a staggered manner in sequence. Through the above structure, the user can fill in file categories on the identification component 8, and due to the staggered design of the identification component 8, there will be no overlap between the identification members, avoiding the phenomenon that markers are blocked and marker words cannot be seen clearly. In this embodiment, the folder can clearly display six identification members simultaneously, achieving a maximum number of identification components 8 while ensuring a most suitable width of the identification members.

In this embodiment, an accommodating opening 32 for receiving files is defined in the accommodating space 3. A cover 33 is connected to one side of the second enclosure member 2 near the accommodating opening 32. The cover 33 is capable of being flipped over to close the accommodating opening 32.

In this embodiment, one end of the cover 33 away from the second enclosure member 2 is provided with a locking member 331, an outer surface of the first enclosure member 1 is provided with a first locking fitting member 13, and the stretchable and retractable connecting member 4 has a retracted state and a stretched state. When the stretchable and retractable connecting member 4 is in the stretched state, the cover 33 is capable of fully covering the accommodating opening 32, and the locking member 331 is configured for engaging with the first locking fitting member 13 to achieve locking. Specifically, the locking member 331 is an elastic tightening strap 3311. The first locking fitting member 13 is a first buckle 131. When the stretchable and retractable connecting member 4 is in the stretched state, the elastic tightening strap 3311 can be sleeved on the first buckle 131 to achieve a purpose of locking. Through the above structure, when the stretchable and retractable connecting member 4 is in the stretched state and the support member 5 is positioned between the first enclosure member 1 and the second enclosure member 2, the cover 33 can be flipped over for closing. Moreover, by sleeving the elastic tightening strap 3311 on the first buckle 131 provided on the first enclosure member 1, the cover 33 can be locked and fixed effectively to protect the folder.

In this embodiment, the second enclosure member 2 is equipped with a second locking fitting member 24. When the stretchable and retractable connecting member 4 is in the retracted state, the cover 33 is capable of fully covering the accommodating opening 32, and the locking member 331 is configured for engaging with the second locking fitting member 24 to achieve locking. Specifically, the second enclosure member 2 is equipped with a hollow clamping slot 241. A protruding second buckle 242 is provided inside the hollow clamping slot 241. When the stretchable and retractable connecting member 4 is in the retracted state, the elastic tightening strap 3311 is capable of wrapping around a bottom portion of the first enclosure member 1 and a bottom portion of the second enclosure member 2 and being sleeved on the second buckle 242 to achieve the purpose of locking. Through the above structure, when it is necessary to compress the folder to a minimum area, the support member 5 can be removed, and the elastic tightening strap 3311 can wrap around a bottom portion of the folder up to a position of the second buckle 242 of the second enclosure member 2 and be sleeved on the second buckle 242, effectively locking and fixing the cover 33, preventing the folder from becoming loose, and facilitating storage and transportation.

In this embodiment, an accommodating opening 32 for receiving files is defined in the accommodating space 3. The first enclosure member 1 and/or the second enclosure member 2 are/is provided with a notch 34 on one side near the accommodating opening 32. The notch 34 is used for hanging a pen cap. Through the above structure, a pen can be hung on the folder, which is convenient for storage and increases the practicality of the folder.

In this embodiment, the first enclosure member 1 and/or the second enclosure member 2 are/is also equipped with an elastic fixing strap 14. Through the above structure, various types of cards or notes can be pressed onto the first enclosure member 1 and/or the second enclosure member 2, increasing the practicality of the folder.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A folder, comprising:

a first enclosure member;

a second enclosure member, wherein the first enclosure member and the second enclosure member are arranged opposite to each other and form an accommodating space, and the accommodating space is used for receiving files;

a stretchable and retractable connecting member, wherein the stretchable and retractable connecting member is connected between the first enclosure member and the second enclosure member, and a size of the accommodating space changes with stretching and retracting of the stretchable and retractable connecting member; and a support member, wherein the support member is detachably connected between the first enclosure member and the second enclosure member, and the support member is used for limiting the accommodating space to a predetermined size;

wherein an accommodating opening for receiving files is defined in the accommodating space, a cover is connected to one side of the second enclosure member near the accommodating opening, and the cover is capable of being flipped over to close the accommodating opening;

wherein one end of the cover away from the second enclosure member is provided with a locking member, an outer surface of the first enclosure member is provided with a first locking fitting member, and the stretchable and retractable connecting member has a retracted state and a stretched state; when the stretchable and retractable connecting member is in the stretched state, the cover is capable of fully covering the accommodating opening, and the locking member is configured for engaging with the first locking fitting member to achieve locking, wherein the second enclosure member is equipped with a second locking fitting member; when the stretchable and retractable connecting member is in the retracted state, the cover is capable of fully covering the accommodating opening, and the locking member is configured for engaging with the second locking fitting member to achieve locking.

2. The folder according to claim 1, wherein the stretchable and retractable connecting member comprises a first stretchable and retractable wall and a second stretchable and retractable wall, the first enclosure member is provided with a first left side end and a first right side end designed opposite to the first left side end, the second enclosure member is provided with a second left side end and a second right side end opposite to the second left side end, the first stretchable and retractable wall is connected between the first left side end and the second left side end, and the second stretchable and retractable wall is connected between the first right side end and the second right side end.

3. The folder according to claim 2, wherein the stretchable and retractable connecting member further comprises a third stretchable and retractable wall, the first enclosure member is provided with a first bottom end, the second enclosure member is provided with a second bottom end, the third stretchable and retractable wall is connected between the first bottom end and the second bottom end, and stretched and retracted states of the third stretchable and retractable wall change with stretched and retracted states of the first stretchable and retractable wall and the second stretchable and retractable wall.

4. The folder according to claim 3, wherein the first stretchable and retractable wall comprises a first accordion-like folded sheet, the second stretchable and retractable wall comprises a second accordion-like folded sheet, and the third stretchable and retractable wall comprises a third accordion-like folded sheet.

5. The folder according to claim 1, wherein the support member is detachably connected to the first enclosure member and the second enclosure member through a connecting device, the connecting device comprises a connecting member provided on the support member, and the connecting device further comprises a connecting fitting member provided on the first enclosure member and the second enclosure member.

6. The folder according to claim 5, wherein the connecting member is a hook surface of a hook and loop fastener, and the connecting fitting member is a loop surface of the hook and loop fastener.

7. The folder according to claim 2, wherein the support member comprises a first support plate, the first support plate is equipped with a first left side edge and an opposite first right side edge, first connecting side plates are respectively rotatably connected to the first left side edge and the first right side edge, and the first support plate is connected between the first left side end and the second left side end through the first connecting side plates.

8. The folder according to claim 7, wherein the support member comprises a second support plate, the second support plate is equipped with a second left side edge and an opposite second right side edge, second connecting side plates are respectively rotatably connected to the second left side edge and the second right side edge, and the second support plate is connected between the first right side end and the second right side end through the second connecting side plates.

9. The folder according to claim 8, wherein the first connecting side plates comprise connecting surfaces that are connected to the first enclosure member and the second enclosure member, the connecting surface is provided with a connecting member, one surface of the first enclosure member connected to the first connecting side plate is provided with a connecting fitting member, and one surface of the second enclosure member connected to the first connecting side plate is provided with a connecting fitting member; the connecting member is a hook surface of a hook and loop fastener, and the connecting fitting member is a loop surface of the hook and loop fastener.

10. The folder according to claim 9, wherein the second connecting side plates comprise connecting surfaces that are connected to the first enclosure member and the second enclosure member, the connecting surface is provided with a connecting member, one surface of the first enclosure member connected to the second connecting side plate is provided with a connecting fitting member, and one surface of the second enclosure member connected to the second connecting side plate is provided with a connecting fitting member; the connecting member is a hook surface of a hook and loop fastener, and the connecting fitting member is a loop surface of the hook and loop fastener.

11. The folder according to claim 3, wherein a gap is defined between an end portion of the first stretchable and retractable wall near the third stretchable and retractable wall and the third stretchable and retractable wall; and a gap is defined between an end portion of the second stretchable and retractable wall near the third stretchable and retractable wall and the third stretchable and retractable wall.

12. The folder according to claim 4, wherein the first accordion-like folded sheet is provided with first folded end surfaces connected to the first enclosure member and the second enclosure member, respectively; the first folded end surfaces are connected to an inner surface of the first enclosure member and an inner surface of the second enclosure member through hot pressing; the second accordion-like folded sheet is provided with second folded end surfaces connected to the first enclosure member and the second enclosure member, respectively; the second folded end surfaces are connected to the inner surface of the first enclosure member and the inner surface of the second enclosure member through hot pressing; the third accordion-like folded sheet is provided with third folded end surfaces connected to the first enclosure member and the second enclosure member, respectively; and the third folded end surfaces are connected to the inner surface of the first enclosure member and the inner surface of the second enclosure member through hot pressing.

13. The folder according to claim 3, wherein a plurality of partition components are provided inside the accommodating space, the partition component is connected between the first stretchable and retractable wall and the second stretchable and retractable wall through hot pressing, the partition component divides the accommodating space into a plurality of accommodating units, and one end of the partition component is connected to the third stretchable and retractable wall through hot pressing.

14. The folder according to claim 13, wherein a protruding identification component is provided at one end of the partition component away from the third stretchable and retractable wall, the partition component comprises a first partition member and a second partition member, the first partition member is equipped with a first identification member, the second partition member is equipped with a second identification member, and the first identification member and the second identification member are designed in a staggered manner.

15. The folder according to claim 14, wherein the partition component further comprises:

a third partition member;

a fourth partition member;

a fifth partition member; and a sixth partition member;

wherein the third partition member is provided with a third identification member, the fourth partition member is provided with a fourth identification member, the fifth partition member is provided with a fifth identification member, and the sixth partition member is provided with a sixth identification member; the first identification member, the second identification member, the third identification member, the fourth identification member, the fifth identification member, and the sixth identification member are designed in a staggered manner.

16. The folder according to claim 1, wherein the locking member is an elastic tightening strap; the first locking fitting member is a first buckle; when the stretchable and retractable connecting member is in the stretched state, the elastic tightening strap can be sleeved on the first buckle to achieve a purpose of locking; the second enclosure member is equipped with a hollow clamping slot; a protruding second buckle is provided inside the hollow clamping slot; and when the stretchable and retractable connecting member is in the retracted state, the elastic tightening strap is capable of wrapping around a bottom portion of the first enclosure member and a bottom portion of the second enclosure member and being sleeved on the second buckle to achieve the purpose of locking.

17. The folder according to claim 1, wherein an accommodating opening for receiving files is defined in the accommodating space, the first enclosure member and/or the second enclosure member are/is provided with a notch on one side near the accommodating opening, and the notch is used for hanging a pen cap.

* * * * *